March 7, 1933.  H. C. ARGE  1,900,854
ALIMENTARY PRODUCT FORMING DEVICE
Filed June 18, 1932  2 Sheets-Sheet 1
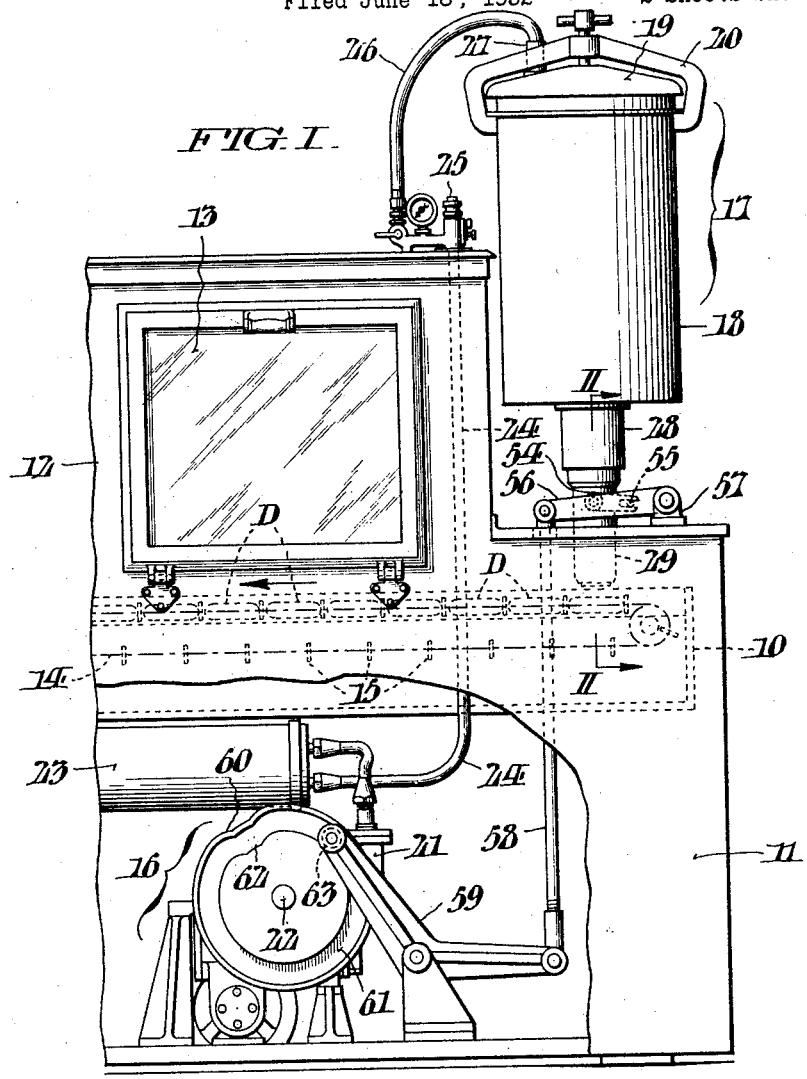
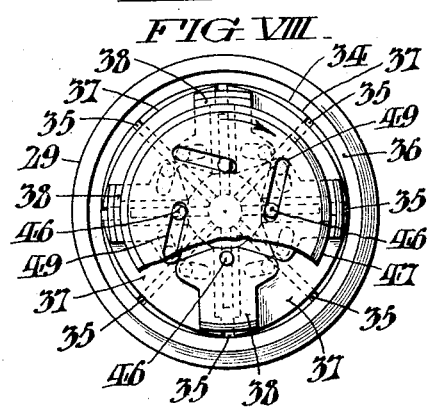
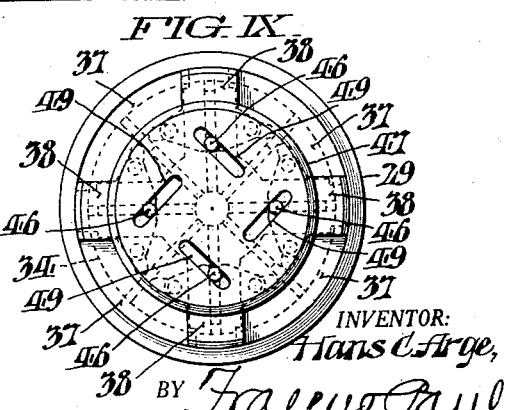
INVENTOR:
Hans C. Arge,
BY
ATTORNEYS.

March 7, 1933. H. C. ARGE 1,900,854
ALIMENTARY PRODUCT FORMING DEVICE
Filed June 18, 1932 2 Sheets-Sheet 2
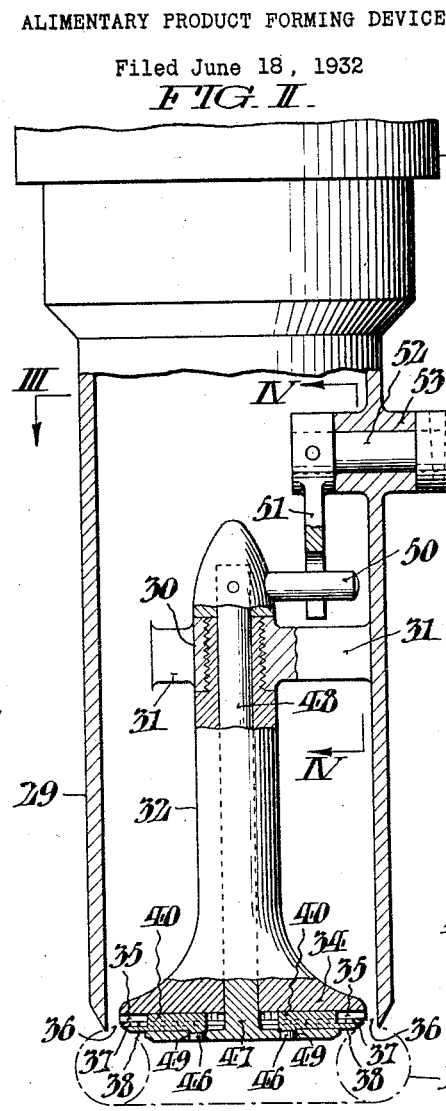
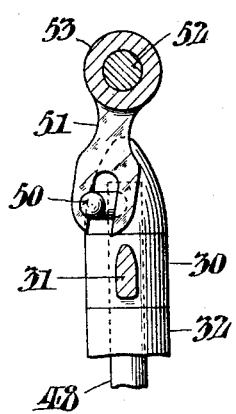
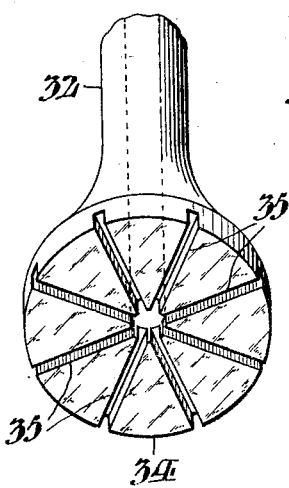
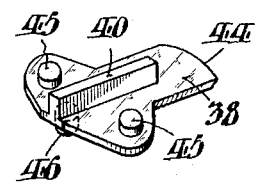
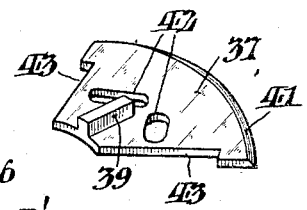
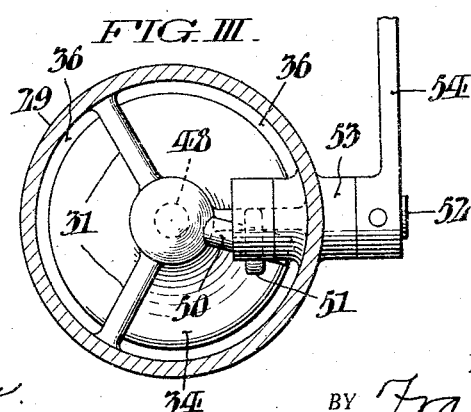
WITNESSES:
John C. Bergner
William Bell, Jr.
INVENTOR:
Hans C. Arge,
BY Fraley Paul
ATTORNEYS.

Patented Mar. 7, 1933

1,900,854

UNITED STATES PATENT OFFICE

HANS C. ARGE, OF NEW YORK, N. Y., ASSIGNOR TO DOUGHNUT MACHINE CORPORATION, OF NEW YORK, N. Y., A CORPORATION OF NEW YORK

ALIMENTARY PRODUCT FORMING DEVICE

Application filed June 18, 1932. Serial No. 618,027.

This invention relates to devices for forming alimentary products from plastic materials; and it has reference more particularly to devices for producing annular formations such as doughnuts from dough or batter.

In commercial forms of forming devices used in connection with automatic doughnut cooking apparatus such as disclosed for example in U. S. Patents Nos. 1,492,542 and 1,823,146 respectively of John C. Bergner and Herbert T. Hunter, the dough is forced from a supply hopper through an annular bottom outlet afforded jointly by a tubular sleeve and cutter disk of a die mechanism, the sleeve being periodically moved axially over the cutter disk to sever the annular unit extrusions of the dough by a shearing action.

The aim of my invention is to enable the severing operation referred to to be accomplished without necessitating relative axial movement as between the sleeve and the cutter disk of the die mechanism. This desideratum I attain as hereinafter fully disclosed through provision of a circumferentially expansible cutter disk composed of a number of radially guided overlapping segments and disposed co-axially within the mouth of the tubular outlet sleeve and operative to sever the extrusions of dough through contact of the outer edges of its segments with the in side of said sleeve.

My invention is also directed in part toward the provision of simple and reliable connections for periodically actuating the die mechanism in proper timed relation with other functions of the automatic cooking apparatus such as disclosed in the patents supra.

In the attached drawings, Fig. I is an illustration in side elevation of a portion of a commercial doughnut cooking apparatus, such as typified in the Hunter patent above referred to, in association with which I have shown a forming device which conveniently embodies the die mechanism of my invention.

Fig. II is a fragmentary detail sectional view of the die mechanism taken as indicated by the arrows II—II in Fig. I, and drawn to a larger scale.

Fig. III is a detail plan sectional view of the mechanism taken as indicated by the arrows III—III in Fig. II.

Fig. IV is a fragmentary detail section taken as indicated by the arrows IV—IV in Fig. II.

Fig. V is a fragmentary perspective view of one of the parts of the die mechanism.

Figs. VI and VII are perspective views of the segments of the expansible cutting disk embodied in the die mechanism.

Fig. VIII shows the invert plan view of the die mechanism with the segments of the cutter disk in the normally retracted position; and Fig. IX is a view similar to Fig. VIII showing the cutter disk expanded.

Briefly described, the doughnut cooking apparatus of Fig. I, chosen for purposes of illustration in connection with my invention, comprises a horizontally elongate trough or receptacle 10 which is enclosed within a sheet metal housing 11 with provision thereover of a chamber 12 accessible through downwardly-swingable hinged glazed windows whereof one is indicated at 13. Incident to cooking, the doughnuts D are progressed afloat in hot cooking liquor contained in the receptacle 10 by an endless sprocket chain conveyor 14, while maintained in definite separation within individual cells defined by equally spaced transverse vanes 15 of said conveyor. Through suitable connections (not shown) with the drive mechanism 16 of the cooking apparatus, the conveyor 14 is slowly moved continuously in the direction indicated by the arrow in Fig. I. The device by which the raw doughnuts are formed is generally indicated by the numeral 17, and, as shown, embodies a vertical cylindric dough hopper 18 with a removable clamp cover 19 which is held in fluid tight relation to said hopper by a screw clamp yoke 20. The dough within the hopper 18 is subject to the influence of a head of compressed air generated by a pump 21 which is actuated, through suitable gearing, not shown, from the shaft 22 of the drive mechanism 16 of the cooking apparatus, and which delivers to an equalizing reservoir 23 located in the space below the receptacle 10 within the housing 11. A pipe 24 leads upward from the reservoir 23 to an adjustable automatic pressure control valve 25 at the top of the housing 11, said valve being coupled, by means of a flexible hose 26, with a nipple 27 on the cover 19 of the dough hopper 18. Under the action of the compressed air head, the dough is forced through a tubular neck 28 at the bottom of the hopper 18.

Coming now to the die mechanism of my invention, it will be observed from Figs. I and II that the outlet 28 is fitted with a diametrically reduced lower end portion in the form of a sleeve 29 which, approximately midway of its height, has an integral axial boss 30 supported by a number of radial arms of a transverse spider 31. Screwed into this boss 30 is the upward tubular stem 32 of a flaring circular head 34 whereof the bottom face is formed in this instance with eight equally spaced radial slots 35. As shown in Fig. II, the head 34 is located immediately within the lower end or mouth of the sleeve 29, with formation between it and the in side of said sleeve, of an annular interval 36 through which the dough is extruded as indicated in dotted lines at D'. Cutting of the dough is accomplished in accordance with my invention by means of an expansible cutter disk constituted by a number of cutter segments 37 and 38—there being in this instance four of each—which are respectively formed with tongues 39, 40 for engaging alternate radial slots 35 in the head 34 previously referred to. As shown in Figs. VII, VIII and IX, the segments 37 have the configuration of quadrants with sharpened arcuate edges 41 of a radius corresponding to that of the bore of the sleeve 29, and with cam slots 42 oppositely inclined relative to the centrally allocated tongues 39. The convergent side edges of the segments 37 are recessed as at 43 for a reason later on explained. The segments 38 (Figs. VI, VII and VIII) are on the other hand T shaped with the outer ends of the center portions sharpened as at 44 and curved to correspond with the inner surface of the sleeve 29. The cross portions of the segments 38 are round ended and provided with upwardly projecting studs 45 which are symmetrically disposed to opposite sides of the centrally allocated tongues 40. Medially of their inner ends the segments 44 are provided with downward studs 46. With the parts assembled as in Figs. II, VIII and IX, the convergent side edges of the segments 37 overlap the segments 38 with the recesses 43 clearing the tongues 40 of the segments 38 and with the studs 45 of the segments 38 engaging the oppositely inclined slots 42 of the segments 37. The segments 37 and 38 are maintained in the assemblage by a rotatable cap disk 47 at the lower end of an actuating shaft 48 which extends upwardly through the axial bore of the stem 32. As shown in Figs. II, VIII and IX, the cap disk 47 is provided with cam slots 49 which are engaged by the downward studs 46 on the cutter disk segments 38. Thus, through rotation of the disk 47 in the direction of the arrow in Fig. VIII, the segments 38 are moved outward from the normal retracted position of Fig. II within the confines of the head 34 through coaction between the cam slots of the head 47 and the studs 46; while through cooperation between the inclined cam slots 42 of the segments 37 and the studs 45 of the segments 38, the latter segments are concurrently moved radially outward at the same rate. The curved cutting edges 41 and 44 of the segments 37 and 38 are in this way brought into pinching contact with the in side of the sleeve 29 to sever the dough previously extruded through the annular space 36 between the head 34 and the sleeve.

For the purpose of periodically operating the die mechanism in coordinated relation with the movement of the progressing conveyor 14 of the cooking apparatus, I provide means as follows: Pinned to the upper end of the actuating stem 48 of the die mechanism above the supporting boss 30, is a finger 50 which is engaged within the forked end of an arm 51 on a shaft 52 journalled in a horizontal bearing boss 53 at one side of the sleeve 29, see Figs. II, III and IV. At its outer end the shaft 52 has pinned to it a horizontal arm 54 with a forked end that engages a lateral stud 55 of a rocker arm 56 (Fig. I) which is pivoted to a fulcrum bracket 57 on a bearing plate of the cooking machine under the dough magazine 18. The rocker arm 56 is actuated, through the medium of a drop link 58 and a bell crank lever 59, by a rotary cam 60 on the shaft 22 of the drive mechanism 16 of the cooking apparatus. As shown, the cam 60 has a face groove 61 with an inward offset at 62 which is influential on a roller 63 on the bell crank lever 59, in causing an actuation of the die mechanism once for each rotation of the shaft 22, the movement of the conveyor 14 being so timed that the severing occurs at the movement when a cell of the conveyor is presented immediately beneath the die mechanism.

Having thus described my invention, I claim:

1. In a device for producing annular formations, such as doughnuts and the like, from plastic material, a hopper for the plastic, die mechanism including a tubular outlet member and a normally contracted radially expansible circular cutter member co-axially within the tubular outlet member, and providing jointly therewith, an annular opening for extrusion of the plastic supplied from the hopper; and means for actuating the cutter member to sever annular extrusions of the plastic by contact of its peripheral edge with the inner surface of the tubular outlet member.

2. In a device for producing annular formations, such as doughnuts and the like, from plastic material, a hopper for the plastic material; means for maintaining a head of compressed air above the dough in the hopper; die mechanism including a tubular outlet member and a normally contracted radially-expansible circular cutter member coaxially within the tubular outlet member, and providing jointly therewith, an annular opening for extrusion of the plastic supplied from the hopper under the influence of the compressed air; and means for actuating the cutter member to sever annular extrusions by contact of its peripheral edge with the inner surface of the tubular outlet member.

3. In a device for producing annular formations, such as doughnuts and the like, from plastic material, a hopper for the plastic material; die mechanism comprising a tubular outlet member and a normally contracted radially expansible circular cutter member coaxially within the tubular member, and providing jointly therewith, an annular outlet for the plastic supplied from the hopper, said cutter member consisting of a number of radially-guided laterally-overlapping disk segments; and means for moving the disk segments of the cutting member outward to sever annular unit extrusions of the plastic by contact of the edges of its segments with the inner surface of the tubular outlet member.

4. In a device for producing annular formations, such as doughnuts and the like, from plastic material, a hopper for the plastic material; die mechanism comprising a tubular outlet member and a normally contracted radially expansible circular cutter disk coaxially within the tubular member and providing jointly therewith, an annular outlet for the plastic supplied from the hopper, said disk member consisting of a number of radially guided segments; and means including a rotary member for shifting the segments of the cutter disk outward simultaneously into contact with the inner surface of the tubular outlet member to sever annular extrusions of the plastic.

5. In a device for producing annular formations, such as doughnuts and the like, from plastic material, a hopper for the plastic material; die mechanism comprising a tubular outlet member, and a normally contracted radially expansible circular cutter disk coaxially within the tubular member and providing jointly therewith, an annular outlet for the plastic supplied from the hopper, said disk member consisting of a number of radially-guided segments; and means for moving the segments of the cutter disk outwardly to sever annular extrusions of the plastic by contact with the inner surface of the tubular outlet member, including a rotary member with cam slots to cooperate with studs on the disk segments.

6. In a device for producing annular formations, such as doughnuts and the like, from plastic material, a hopper for the plastic material; die mechanism comprising a tubular outlet member, and a normally contracted radial expansible circular cutter disk coaxially within the tubular member, and providing jointly therewith, an annular outlet for the plastic supplied from the hopper, said disk member consisting of a number of radially guided segments, whereof alternate segments are provided with studs to engage cam slots in the other segments, and a rotatable actuating disk with cam slots engaging studs on the first mentioned groups of the cutter segments; and means for rotating the actuating disk whereby the first mentioned set of the cutter segments are moved outwardly and the remaining segments concurrently moved outwardly through coaction between the cam slots in them and the studs on the other segments to sever annular extrusions of the plastic through contact of the outer edges of the segments with the inner surface of the tubular outlet member.

7. In a device for producing annular formations, such as doughnuts and the like, from plastic material, a hopper for the plastic material; die mechanism including a tubular bottom outlet member and a normally contracted radially expansible cutter disk supported coaxially within the tubular member at its lower end by an upward stem with support in a transverse spider at the interior of the tubular outlet member, said cutter disk providing jointly with the outlet member, an annular opening for the plastic supplied from the hopper; and means for expanding the cutter member to sever annular extrusions by contact of its peripheral edge with the inner surface of the tubular outlet member, including a shaft extending axially up through the supporting stem for said disk, and connections for rotating the shaft from the exterior of the outlet member.

8. In a device for producing annular formations, such as doughnuts, and the like, from plastic material, a hopper for the plastic material; a die mechanism including a tubular outlet member and a normally contracted radially expansible cutter disk supported coaxially within the tubular member at the bottom by an upward stem with support in a transverse spider at the interior of the tubular outlet member, said disk providing jointly with the outlet member, an annular opening for the plastic supplied from the hopper; and means for expanding the cutter member to sever annular extrusions by contact of its peripheral edge with the inner surface of the tubular outlet member including a shaft extending axially up through the supporting stem of said disk, a finger secured to the top end of the shaft within the outlet member, an arm operatively coordinated with the finger and mounted on a shaft extending horizontally through the outlet member to the exterior, an arm at the outer end of the said horizontal shaft, a rotary cam, and interposed connections between the last mentioned arm and the rotary cam.

In testimony whereof, I have hereunto signed my name at Ellicott City, Maryland this 10th day of June, 1932.

HANS C. ARGE.